United States Patent [19]

Wei et al.

[11] 4,375,541
[45] Mar. 1, 1983

[54] METHOD FOR SEPARATING VINYL CHLORIDE FROM POLYMERS

[75] Inventors: Chung H. Wei, Wilminton, Del.; Leroy B. Kuhn, Eaton, Conn.

[73] Assignee: Stauffer Chemical Company, Westport, Conn.

[21] Appl. No.: 126,624

[22] Filed: Mar. 3, 1980

Related U.S. Application Data

[63] Continuation of Ser. No. 894,772, Apr. 10, 1978, abandoned, which is a continuation of Ser. No. 705,240, Jul. 14, 1976, abandoned.

[51] Int. Cl.³ ............................ C08F 6/24; C08F 6/16; C08F 6/14
[52] U.S. Cl. .................................... 528/500; 528/501; 528/502; 528/503
[58] Field of Search ................ 528/500, 501, 502, 503

[56] References Cited

U.S. PATENT DOCUMENTS

| | | | |
|---|---|---|---|
| 2,349,412 | 5/1944 | Douglas | 528/502 X |
| 3,545,093 | 12/1970 | Forster | 34/1 |
| 4,007,022 | 2/1977 | Schleicher | 55/41 |
| 4,008,361 | 2/1977 | Park | 528/503 |
| 4,017,445 | 4/1977 | Grosse-Wortmann | 528/500 X |
| 4,032,497 | 6/1977 | Kidoh | 260/29.6 R |

FOREIGN PATENT DOCUMENTS 56169 10/1968 Poland ............................... 528/502

Primary Examiner—C. A. Henderson
Attorney, Agent, or Firm—Roger S. Benjamin

[57] ABSTRACT

A method for separating vinyl chloride monomer from an aqueous polyvinyl chloride resin mixture which comprises passing the aqueous resin mixture at an elevated temperature and sub-atmospheric pressure over a vibrating surface.

9 Claims, 3 Drawing Figures

METHOD FOR SEPARATING VINYL CHLORIDE FROM POLYMERS

CROSS-REFERENCE TO RELATED APPLICATIONS

This application is a continuation of application Ser. No. 894,772, filed Apr. 10, 1978 and now abandoned; which is a continuation of application Ser. No. 705,240, filed July 14, 1976, now abandoned.

BACKGROUND OF THE INVENTION

The invention relates to an improved method for removing residual vinyl chloride monomer from aqueous polyvinyl chloride resin mixtures.

The preferred methods for preparing polyvinyl chloride comprise carrying out the polymerization of vinyl chloride in an aqueous emulsion or suspension. The aqueous resin mixture obtained from the polymerization reactor generally contains from about 10 to about 60% by weight polyvinyl chloride and from about 0.5 to about 10% by weight residual vinyl chloride monomer. The vinyl chloride monomer tends to remain with the polyvinyl chloride during processing of the material and is released when the resin is dried or heated during the processing.

A major portion of the vinyl chloride monomer can be removed from the polyvinyl chloride during the drying operation. However, the vinyl chloride monomer is lost with the gases from the dryer which increases the cost of producing polyvinyl chloride. In addition, the vinyl chloride monomer in the gases from the drier can contaminate the environment in the vicinity of the drier.

In order to improve the efficiency of vinyl chloride utilization in the process and to reduce the amount of vinyl chloride introduced into the environment, attempts have been made to lower the concentration of vinyl chloride monomer in the aqueous resin mixture before processing.

It has been suggested that the monomer can be separated from the polyvinyl chloride by releasing the pressure on the aqueous resin mixture in the reactor and stripping at reduced pressure or by steam distillation. These methods are not commercially useful when the aqueous resin mixture is a latex due to the foaming of the latex and the difficulty in achieving low levels of vinyl chloride monomer in the latex. Even with a suspension resin mixture it is difficult to achieve low levels of vinyl chloride monomer in the aqueous resin mixture.

U.S. Pat. No. 3,052,663 discloses a method for separating unreacted vinyl chloride monomer from polyvinyl chloride latex by contacting the latex with an aliphatic hydrocarbon. The process requires many difficult contacting and filtration steps to separate the polyvinyl chloride from the hydrocarbon phase. The method would not be suitable where the resin is to be spray dried to form a white, small particle size, powdery product.

Polish Pat. No. 56,169 discloses that monomer can be removed from latex and foaming can be controlled by passing the polyvinyl chloride latex over an inclined surface of varying slope. The amounts of vinyl chloride monomer remaining in the latex is not disclosed in the patent.

It is an object of the present invention to provide an effective method for removing vinyl chloride monomer from aqueous resin mixtures of polyvinyl chloride. It is an object of the invention to provide an effective method of removing vinyl chloride monomer from an aqueous suspension resin. It is a further object of the invention to provide a method for controlling foaming and to minimize flocculation due to drying of foams when removing vinyl chloride monomer from polyvinyl chloride latex. It is a further object of the invention to provide a method by which a latex containing less than 400 parts per million vinyl chloride monomer can be prepared.

BRIEF DESCRIPTION OF THE INVENTION

According to the present invention, vinyl chloride monomer can be separated from an aqueous polyvinyl chloride resin mixture by passing the aqueous resin mixture at an elevated temperature and sub-atmospheric pressure over a vibrating surface.

Extremely low pressure is not critical but lower pressures tend to provide for more rapid removal of the vinyl chloride monomer. Absolute pressure between about 0.1 and about 24 inches of mercury are preferred.

Heating of the latex aids in a rapid removal of the vinyl chloride monomer from the aqueous polyvinyl chloride resin mixture. Temperatures in the range from about 110° F. to about 180° F. have been found suitable. Suitable temperature levels depend upon the emulsifying agent, the concentration and composition of a latex or the suspending agent, concentration and particle size of the resin. In general, high temperatures provide for more rapid removal of the vinyl chloride monomer. Temperatures up to those at which the properties of the aqueous resin mixture are adversely affected to a degree which makes them unsuitable for intended uses are useful.

DETAILED DESCRIPTION OF THE INVENTION

Figure 1:
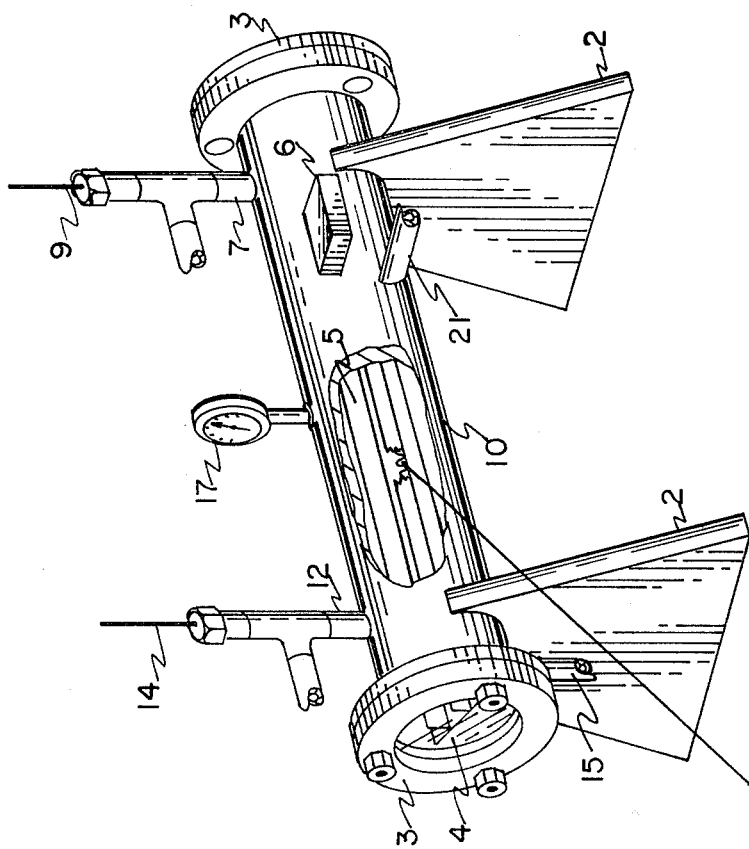
FIG. 1 is a drawing of the vibrating apparatus utilized in examples 1–8.

As used herein, the term "polyvinyl chloride" is meant to include the polymers and copolymers of vinyl cloride in which at least 70% of the copolymer are vinyl chloride units. That is, polyvinyl chloride with up to about 30% of the vinyl chloride substituted by other monomers is intended to fall within the scope of the present invention.

The phrase aqueous resin mixture as used herein refers to aqueous suspensions or emulsions of polyvinyl chloride.

A latex obtained from a vinyl chloride emulsion polymerization generally contains an emulsifying agent, residual catalyst, water and a polyvinyl chloride content of from about 10 to about 60% by weight. The latex usually contains from about 0.5 to about 10% by weight unpolymerized vinyl chloride monomer incorporated in the latex. Methods for preparing polyvinyl chloride latexes and ethylenically unsaturated compounds which are copolymerizable with the vinyl chloride are well known in the art. Any polyvinyl chloride latex containing unreacted vinyl chloride monomer is intended to fall within the ambit of the present invention.

An aqueous suspension resin is usually prepared from an aqueous suspension of vinyl chloride utilizing a monomer soluble catalyst and suspending agents which tend to maintain the resin particles in suspension in the water phase. Aqueous suspension resin mixtures can contain from about 10 to about 50% solids and usually from about 25 to 35% solids on a weight basis. Methods for preparing suspension resins are well known in the art.

The vibrating surface over which the aqueous resin mixture is passed can be substantially horizontal or can be a sloping surface. It is preferred that the surface be set at an angle, said angle can vary over the length of the surface. It is preferred that the surface be sloping to encourage the flow of the aqueous resin mixture over the vibrating surface.

The surface can be smooth or can be modified by ridges, undulations, bumps, dimples, protrusions and the like. Modification of the surface increases the interaction between the vibrating surface and the aqueous resin mixture and provides for more effective removal of the vinyl chloride monomer from the mixture.

The vibrating surface can be in the form of a cone, a flat plate or a chute over which the aqueous resin mixture is caused to pass. As stated above, the vibrating surface can be substantially horizontal or can be sloped to encourage the flow of the aqueous resin mixture over the surface. Preferably, the vibrating surface is in the form of a vibrating chute. The chute can be provided in a configuration which conforms to the chamber in which the sub-atmospheric pressure is provided. A spiral chute within a cylindrical vessel can provide a large amount of surface in a relatively small vessel.

The vibrating surface can be oscillating or vibrating over a wide frequency range, but lower frequencies in the range of less than about 6,000 cycles per minute are preferred. Lower frequencies of vibration are preferred since they permit larger amplitude of movement to be achieved without undue strain on the equipment. The control of foaming is more readily achieved at the higher frequencies of vibration in the range. The optimum effectiveness is achieved by balancing amplitude of the oscillation or vibration motion with the frequency of the vibration.

The amplitude of the vibration is not critical. Large amplitudes of vibration and movement of the vibrating surface increases the effectiveness of the process for removing vinyl chloride monomer from aqueous polyvinyl chloride resin mixtures. However, it is known to one skilled in the art that large shear forces can adversely affect polyvinyl chloride latexes. The amplitude of vibration can be increased to the point that the stability of the latex is unduly affected by the large shear forces which are generated over large amplitudes of vibration of the vibrating surface. In general, larger amplitudes of vibration increase the effectiveness of the process. However, the amplitude of the vibration should not be so great as to unduly adversely affect the operating ability of the equipment wherein the process is carried out. Larger amplitudes of vibration can be employed at lower frequencies.

The reasons for the effectiveness of the method for removing vinyl chloride monomer from an aqueous resin mixture is not fully understood. However, the effectiveness is believed to be due to a substantial reduction in foaming of the aqueous mixture and a rapid and thorough mixing of the aqueous resin mixture as it passes and flows over the vibrating surface. The rapid mixing of the aqueous resin mixture exposes the resin particles to the surface of the aqueous mixture where the vinyl chloride monomer can escape from the resin.

As used herein, "elevated temperature" refers to a temperature above ambient and below the temperature at which the aqueous resin mixture is adversely affected by the temperature. Latexes are most easily affected by elevated temperature. The temperature at which a latex coagulates is dependent upon the emulsifying agents utilized in the preparation of the latex and the prior history of the material. The temperature is dependent to a large extent on the pressure maintained on the latex as it passes over the vibrating surface. Generally, temperatures between about 110° and about 180° F. are suitable and temperatures between about 130° and about 175° F. are most preferred.

The temperature of the aqueous resin mixture can be maintained at the required level by heating the aqueous resin mixture before contact with the vibrating surface, heating the vibrating surface, introducing steam directly into the stripping zone in which the aqueous resin mixture is flowing over the vibrating surface or other means which do not adversely affect the aqueous resin mixture.

The process of the invention is carried out by passing the aqueous resin mixture over the vibrating surface at sub-atmospheric pressure. The efficiency of the apparatus increases as the pressure is lowered, but any pressure below atmospheric is suitable. Generally, absolute pressures between about 0.1 and about 24 inches of mercury are preferred and absolute pressures between about 1 and about 20 inches of mercury are most preferred since they can be easily achieved with commercially reliable equipment and can provide an aqueous resin mixture with a reduced concentration of vinyl chloride monomer.

The aqueous resin mixture can be maintained at sub-atmospheric pressure by mounting the vibrating surface within a vessel in which the pressure can be reduced below atmospheric. Since vinyl chloride monomer is removed from the aqueous resin mixture, evacuating means must be provided to maintain the pressure in the desired range. The vibrating surface can be fabricated in such a manner that the surface is part of the vessel. A vessel such as a covered chute down which the aqueous resin mixture flows would be suitable. The chute and the cover can be vibrated together. The vessel and the surface can be vibrated as a unit or the surface can be mounted in the vessel in such a manner that it can be vibrated in a manner independent of the vessel in which it is housed.

The manner of mounting and providing for vibrating of the surface is well understood by one skilled in the art.

The process of the present invention is most effective in reducing the vinyl chloride monomer content of polyvinyl chloride resin emulsions. The present invention is useful since it is most difficult to remove vinyl chloride monomer from a polyvinyl chloride resin emulsion on a commercial scale.

FIG. 1 is a drawing of the apparatus utilized in examples 1–8 presented herein. Vessel 10 is a 10-inch diameter pipe about 10 feet long supported on supports 2. Supports 2 are adjusted by addition of spacers at the bottom to provide the slope desired for a particular experiment. Vessel 10 has flanged ends 3 having mounted thereon clear plastic windows 4, so that the behavior of the aqueous resins mixture can be observed during operation of the process.

Vibrating surface 5 is a metal surface rigidly mounted in vessel 10. A smooth vibrating surface and a surface having one quarter inch undulations which run across the short direction of the surface could be mounted in vessel 10.

Vibrating means 6 are mounted on vessel 10 as shown or are mounted on supports 2. Surface 5 is vibrated by vibrating vessel 10 in which it is mounted. The aqueous resin mixtures enter the vessel and are introduced to the vibrating surface 5 through line 7. The temperature of the aqueous resin mixtures entering vessel 10 is measured by thermocouple 9 in line 7.

The aqueous resin mixture flows over vibrating surface 5, falls from the vibrating surface to the bottom of vessel 10 and flows to a holding tank (not shown) through line 15.

A sample of the aqueous resin mixture after passing over the vibrating surface can be obtained by isolating a portion of the latex flowing in line 15.

Sub-atmospheric pressure is maintained in vessel 10 by means of a steam jet (not shown) which removes vapors from vessel 10 through line 12. The temperature of the aqueous resin mixture at the end of the vibrating surface is measured by thermocouple 14.

The pressure in vessel 10 is measured by pressure gauge 17. The temperature of the aqueous resin mixture is maintained by introducing steam directly into vessel 10 through line 21.

During the experiments, samples of the aqueous resin mixture entering vessel 10 and leaving vessel 10 are taken and the amount of vinyl chloride monomer in the aqueous resin mixture is determined.

Figure 2:
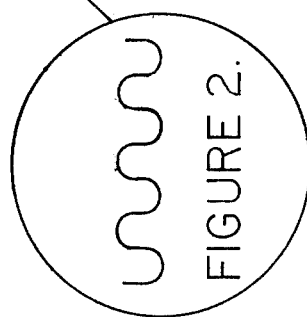
FIG. 2 is a drawing of the undulating surface utilized in examples 1–8.

FIG. 2 is a cut out of a section of vibrating surface 5 showing the texture of the undulating surface utilized in examples 1–8. The undulations had an amplitude of 0.25 inches and a period of 0.5 inches.

Figure 3:
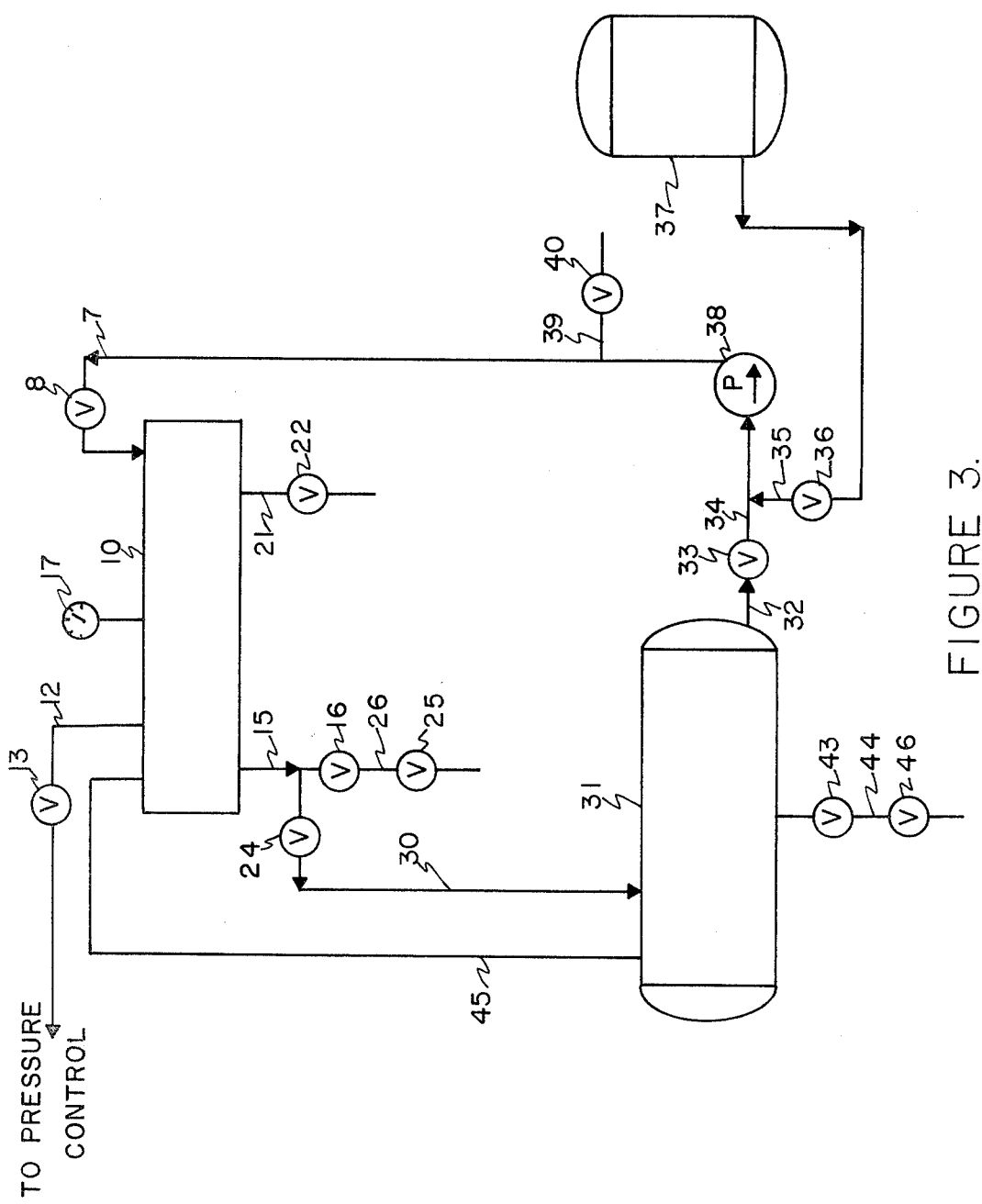
FIG. 3 is a flow diagram of the apparatus utilized in examples 1–8.

FIG. 3 is a schematic flow diagram of the apparatus utilized in examples 1–8. The same numbers refer to the same apparatus as in FIG. 1.

Vessel 37 contains an aqueous resin mixture from a vinyl chloride polymerization reactor. The aqueous resin mixture is prestripped by release of pressure on the polymerization reactor. The aqueous resin mixture is conveyed through line 35, valve 36 and line 34 to pump 38. Pump 38 was a Moyno TM pump which pumps the aqueous resin mixture through line 7 and valve 8 to vessel 10 which contains the vibrating surface over which the aqueous resin mixture flows.

The aqueous resin mixture after passing over the vibrating surface, passes out of vessel 10 through line 15 valve 24 and line 30 to vessel 31. Vent line 45 equalizes pressure between vessel 31 and vessel 10 so that the aqueous resin mixture can flow unimpeded from vessel 10 to vessel 31.

Samples of aqueous resin mixture from line 7 can be taken through line 39 and valve 40. Samples of aqueous resin mixture after passing over the vibrating surface are obtained by means of valve 16, pipe 26 and valve 25.

The pressure in vessel 10 is monitored by pressure gauge 17. The sub-atmospheric pressure is maintained in vessel 10 by pressure control means (steam ejector not shown) which removes gases from vessel 10 through line 12 and valve 13.

Aqueous resin mixture from the vinyl chloride polymerization reactor is pumped over the vibrating surface and the effect of one pass over the vibrating surface on the vinyl chloride monomer content of the aqueous resin mixture can be determined. The aqueous resin mixture collected in vessel 31 can be circulated over the vibrating surface, and the effect of multiple passes of the aqueous resin mixture over the vibrating surface on the vinyl chloride monomer content of aqueous resin mixture determined.

In practice, the aqueous resin mixture was passed over the vibrating surface. The concentration of vinyl chloride monomer in the aqueous resin mixture in line 15 after one pass was determined. After all of the aqueous resin mixture in vessel 37 had passed to vessel 31 the aqueous resin mixture in vessel 31 was continuously circulated over the vibrating surface through line 32 valve 33 and line 34 to pump 38. Samples of aqueous resin mixture from vessel 31 were taken at predetermined time intervals through valve 43 line 44 and valve 46. The double valve arrangement was required to permit samples to be taken from vessel 31 which is at subatmospheric pressure.

Utilizing the apparatus shown in FIG. 3 the effect of frequency and amplitude of vibration, slope of the surface, texture of the surface, circulation rate, temperature and subatmospheric pressure could be readily determined.

Samples of the aqueous resin mixture were dissolved in tetrahydrofuran and analyzed for vinyl chloride monomer content by gas chromatography.

As used herein, all concentration are by weight unless otherwise noted.

EXAMPLE 1

Effect of Vibration

Samples of a latex containing about 34.7% vinyl chloride polymer were circulated over the surface of the apparatus of FIG. 1. The chute surface is an undulating surface about 10 feet long with undulation of 0.25 inch amplitude and a 0.5 inch period, which run across the short dimension (4 inch) of the surface.

The apparatus was maintained substantially level with a slope of 0.05 inches per foot. A sample of latex in the amount of about 155.5 pounds was circulated at the rate of 15.7 pounds per minute over the vibrating surface. The temperature of the latex was maintained at 164° F. by addition of steam directly into the vessel in which the surface was mounted. The pressure on the latex was maintained at about 20 inches of mercury vacuum, i.e., below atmospheric pressure.

The surface was vibrated at 3,600 cycles per minute over an amplitude of 0.008 inches in the vertical direction for the test with vibration. The vibration frequency and amplitude were measured by an I.R.D. Vibrator Analyzer Model 350 Manufactured by I.R.D. Incorporated. The results of the tests are shown in Table 1.

| Time Minutes | Concentration Vinyl Chloride Monomer (parts per million) | |
|---|---|---|
| | Without Vibration | With Vibration |
| Start | 13,139 | 19,327 |
| 1st Pass | 2,728 | 1,932 |
| 10 | 2,010 | 833 |
| 20 | 1,023 | 546 |
| 30 | 733 | 444 |
| 40 | 580 | 254 |
| 50 | 574 | 188 |

The table clearly shows that vibration increases the effectiveness of the process for removing vinyl chloride monomer from the latex. The two latex samples utilized in the example were of the same type of latex but were manufactured at different times.

EXAMPLE 2

Effect of Undulations

The apparatus of example 1 was utilized to separate vinyl chloride monomer from latex at a temperature of from 165° to 168° F. and pressure of 19–20 inches of mercury below atmospheric pressure. The surface was vibrated at 870 cycles per minute over an amplitude of 0.053 inches in the vertical direction with the vibrating surface at a slope of 0.4 inches per foot.

The undulating surface was replaced with a 5.25 inch wide flat plate and the experiment repeated utilizing a second sample of polyvinyl chloride latex.

An amount of 250 pounds of latex having about 37 percent solids on a dry weight basis was utilized in the experiments. The latex circulation rate was 51.3 pound per minute.

The starting material was passed over the vibrating surface and the vinyl chloride monomer content of the latex was measured after one pass.

The latex sample was then circulated over the vibrating surface. Samples were taken from tank 31 at timed intervals and the vinyl chloride monomer concentration measured.

The results of the experiments are shown in Table 2.

The pressure was monitored at about 20 inches of mercury vacuum during a major portion of each run. The pressure was higher at the beginning of a run when vinyl chloride monomer was rapidly released from the latex.

The results of the run are shown in Table 3.

TABLE 3

| Slope $\frac{\text{inches}}{\text{per ft.}}$ | 0.05 | 0.20 | 0.40 | 1.20 |
| --- | --- | --- | --- | --- |
| Circulation Rate | 20.85 | 20.85 | 20.85 | 18.9 |
| Sample Size | 150 pounds | 150 lbs. | 150 lbs. | 167 lbs. |
| Temperature | 165° F. | 165° F. | 165° F. | 155–158° F. |
| Time | Vinyl Chloride Concentration (parts per million) | | | |
| Start | 15,632 | 16,799 | 10,925 | 12,194 |
| First Pass | 4,013 | 8,222 | 3,550 | — |
| 10 | 1,041 | 597 | 81 | 1,271 |
| 20 | 706 | 217 | 20 | — |
| 30 | 465 | 160 | 20 | 683 |
| 40 | 331 | — | — | 509 |
| 50 | 219 | 119 | — | — |
| 60 | 122 | — | 11 | 297 |
| 70 | — | 1–3 | 9 | |

The data of Table 3 clearly shows that the effectiveness of the vibrating surface for separating vinyl chloride monomer from the latex can be increased by sloping the vibrating surface.

TABLE 2

| | | Time (Minutes) | | | | | | |
| --- | --- | --- | --- | --- | --- | --- | --- | --- |
| Surface | Width | Start | 1st Pass | 5 | 10 | 20 | 30 | 60 | 90 |
| | | Vinyl Chloride Concentration (parts per million) | | | | | | | |
| Undulating | 4 inch | 25,081 | 829 | 740 | 561 | 412 | 310 | 151 | 82 |
| Flat | 5.25 in. | 18,373 | 1600 | 843 | 486 | 345 | 269 | 204 | 105 |
| Flat | *Adjusted to 4 in. | | 2080 | 1106 | 632 | 449 | 350 | 265 | 136 |

*For comparison purposes, the results obtained with the 5.25 inch wide surface were adjusted to 4 inch width on the basis that the concentration of vinyl chloride monomer was proportional to the area of the surface. The concentration shown for the 5.25 inch wide surface was multiplied by the ratio $\frac{5.25}{4.0}$ to arrive at the adjusted FIG.

The results of the experiment clearly show that the undulations substantially improve the effectiveness of the vibrating surface for removing vinyl chloride monomer from polyvinyl chloride latex.

EXAMPLE 3

Effect of Slope of Vibrating Surface

The apparatus of Example 1 was utilized to separate vinyl chloride monomer from polyvinyl chloride latex. The slope of the vibrating surface was varied and the effect of the slope of the surface of the removal of vinyl chloride monomer from the latex was determined.

The surface was vibrated at 870 cycles per minute over an amplitude of 0.08 inches in the vertical direction.

EXAMPLE 4

Effect of Latex Flow Rate

The apparatus of Example 1 was utilized to determine the effect of latex flow rate on the removal of vinyl chloride monomer. The vibrating surface was set at a slope of a 0.4 inch per foot. Latex samples of about 170 pounds containing about 40.7 percent polyvinyl chloride were circulated over the undulating surface which was vibrating at 870 cycles per minute with an amplitude of 0.034 inches in the vertical direction. The latex from the feed tank was passed over the vibrating surface and then circulated over the vibrating surface. The samples were taken from tank 31 at periodic intervals and the vinyl chloride content of the latex was determined.

The results of the runs are shown in Table 4.

TABLE 4

| Circulation Rate Minutes | 31.1 pounds/minute | | | 21.1 pounds/minute | | | 10 pounds/minute | | |
|---|---|---|---|---|---|---|---|---|---|
| | Temp °F. | Press (Vacuum) Inches of Mercury | Vinyl Chloride (parts per million) | Temp °F. | Press (Vacuum) Inches or Mercury | Vinyl Chloride (parts per million) | Temp °F. | Press (Vacuum) Inches of Mercury | Vinyl Chloride (parts per million) |
| Start | | | 44,992 | | | 44,227 | | | 40,785 |
| 5 | 151 | 18 | 4,247 | 144 | 21 | 3,614 | 136 | 21 | 2,980 |
| 10 | 156 | 19 | 2,790 | 147 | 21 | 2,453 | 141 | 21 | 2,621 |
| 20 | 160 | 21 | 966 | 151 | 21 | 1,469 | 146 | 24 | 2,071 |
| 30 | 160 | 21 | 457 | 155 | 21 | 972 | 150 | 22 | 1,130 |
| 60 | 161 | 21 | 120 | 157 | 22 | 399 | 158 | 21 | 716 |
| 90 | 162 | 22 | 69.2 | 158 | 22 | 191 | 160 | 22 | 276 |
| 120 | | | | 160 | 22 | 97.5 | 160 | 215 | 125 |

The data of Table 4 clearly illustrates that an increase in the circulation rate will more rapidly remove vinyl chloride monomer from the polyvinyl chloride latex. However, from the amount of vinyl chloride monomer in the latex at the 5 minute time interval, one can see that more vinyl chloride monomer is removed from the vinyl chloride during each pass over the vibrating surface at the lower flow rates.

In operation, one must balance the detrimental effects of pumping of the latex against the rate at which the vinyl chloride monomer is to be removed from the latex.

EXAMPLE 5

The effect of the flow rate on the amount of vinyl chloride monomer removed from vinyl chloride latex in one pass over the vibrating surface of Example 1 was determined. The surface was set at a slope of 0.05 inches per foot and vibrated at 3,600 cycles per minute over an amplitude of 0.008 inches in a vertical direction. All the runs were made by preheating the feed to 160°–165° F. The pressure was maintained at about 20 inches of mercury vacuum during the run. The test results are shown in Table 5.

TABLE 5

| Feed Rate pounds minutes | Polyvinyl Chloride in Latex Percent | Vinyl Chloride Monomer parts per million | |
|---|---|---|---|
| | | Feed | After one pass |
| 0.5 | 38.6 | 29,500 | 795.7 |
| 5.4 | 38.7 | 22,886 | 734 |
| 8.3 | 38.6 | 29,500 | 968.3 |
| 14.8 | 33.4 | 28,180 | 723.7 |
| 20.1* | 41.8 | 12,534 | 1197 |

*17 inches of mercury vacuum.

The data of Table 5 shows that the vinyl chloride monomer content of the latex can be substantially reduced in one pass over the vibrating surface.

EXAMPLE 6

The interactions of the parameters which affect the removal of vinyl chloride monomer from a polyvinyl chloride latex were determined by operating the apparatus of Example 1 under varied operating conditions.

The undulating surface of Example 1 was vibrated at 3,600 cycles per minute at an amplitude of 0.008 inches in the vertical direction when vibration was utilized. The vinyl chloride monomer content of the latex was measured after one pass over the surface. The surface was set at a slope of 0.05 inches per foot.

The results of the experiments are shown in Table 6.

TABLE 6

| Polyvinyl Chloride in Latex Percent | Feed Rate lbs. min. | Feed Temp °F. | Pressure (Vacuum) inches of Mercury | Vinyl Chloride Monomer (parts per million) | | Vibration |
|---|---|---|---|---|---|---|
| | | | | Feed | Product | |
| 32 | 0.79 | 145 | 16 | 25,231 | 1760 | Yes |
| 32 | 0.79 | 145 | 16 | 25,231 | 2247 | No |
| 38.6 | 0.85 | 137 | 17 | 20,707 | 4440 | Yes |
| 38.6 | 8.3 | 156 | 20 | 29,500 | 968 | Yes |
| 33.4 | 14.8 | 162 | 20 | 28,180 | 724 | Yes |
| 41.8 | 20.1 | 160–165 | 17 | 12,534 | 1197 | Yes |
| 39.3 | 19.11 | 140 | 18 | 16,037 | 3761 | Yes |
| 39.3 | 16.6 | 140 | 18 | 16,037 | 4467 | No |
| 36.7 | 16.0 | 148 | 20 | 16,368 | 1414 | Yes |
| 36.7 | 15.0 | 148 | 20 | 16,368 | 2993 | No |
| 38.7 | 5.4 | 160–65 | 20 | 22,886 | 734 | Yes |
| 38.7 | 5.3 | 160–65 | 20 | 22,886 | 1371 | No |

The data in Table 6 clearly illustrates the effect the parameters have on the effectiveness of the vibrating surface for removing vinyl chloride monomers from polyvinyl chloride latex.

EXAMPLE 7

The apparatus of Example 1 was utilized to determine the effect of latex temperature on the separation of vinyl chloride monomer. The vibrating surface was set at a slope of 0.4 inches per foot and vibrated at 870 cycles per minute at an amplitude of 0.073 inches in the vertical direction. A sample of 170 pounds of latex was circulated at a rate of 58.4 pounds per minute over the vibrating surface. The pressure was maintained at between 23 and 25 inches of mercury below atmospheric pressure during the runs.

The latex was passed from the feed tank 37 over the vibrating surface to tank 31. The latex was then circulated over the vibrating surface and samples were taken at intervals from tank 31 and the vinyl chloride monomer in the latex was measured.

The data in Table 7 shows the results of the experiments.

TABLE 7

| Time (Minutes) | Temp. °F. | Vinyl Chloride Monomer (parts per million) | Temp. °F. | Vinyl Chloride Monomer (parts per million) |
|---|---|---|---|---|
| Start | | 44,855 | | 43,533 |
| 5 | 149 | 2,801 | 145 | 2,411 |
| 10 | 148 | 1,298 | 143 | 1,512 |
| 20 | 145 | 498 | 140 | 887 |
| 30 | 141 | 250 | 138 | 506 |

TABLE 7-continued

| Time (Minutes) | Temp. °F. | Vinyl Chloride Monomer (parts per million) | Temp. °F. | Vinyl Chloride Monomer (parts per million) |
|---|---|---|---|---|
| 60 | 140 | 91 | | |
| 70 | | | 138 | 142 |
| 90 | 144 | 20 | 140 | 56 |

The data in the Table clearly shows that higher temperatures are more effective in removing vinyl chloride monomer from the polyvinyl chloride latex.

EXAMPLE 8

The apparatus of claim 1 was utilized to reduce the vinyl chloride monomer content of a polyvinyl chloride latex to below 10 parts per million.

A 170 pound sample of the latex was passed over the apparatus of Example 1 and collected in vessel 31. The latex was then circulated over the vibrating surface at the rate of 31.1 pponds per minute and latex samples were taken from vessel 31 and analyzed for vinyl chloride monomer.

The vibrating surface was set at a slope of 0.4 inches per foot and vibrated at 870 cycles per minute over an amplitude of 0.073 inches in the vertical direction. The latex was maintained at a pressure of 20–23 inches of mercury below atmospheric pressure while passing over the vibrating surface.

The temperature of the latex was maintained by introducing steam directly into vessel 10 at a point beneath the vibrating surface.

The results of the experiment are shown in Table 8.

TABLE 8

| Time Minutes | Latex Feed Temp. °F. | Latex Temp. in Vessel 10° F. | Vinyl Chloride Monomer parts per million |
|---|---|---|---|
| 0 | | | 37,037 |
| 5 | 150 | 157 | 1,517 |
| 10 | 154 | 163 | 1,194 |
| 20 | 157 | 160 | 366 |
| 30 | 160 | 163 | 234 |
| 60 | 168 | 171 | 109 |
| 90 | 161 | 166 | 34.6 |
| 105 | 162 | 167 | 5.6 |

The data in Table 8 illustrates that the vinyl chloride monomer content of a polyvinyl chloride latex can be reduced to relatively low levels by the process of the invention.

The high temperature and vibration reduced the mechanical stability of the latex during the run.

The mechanical stability of the control sample was 16 minutes. The mechanical stability was reduced to 4 minutes after 105 minutes circulation over the vibrating surface.

The mechanical stability was measured by placing a 100 milliter sample on a HAMILTON BEACH TM milk shake machine and noting the number of minutes required to coagulate the latex.

TABLE 9

| Resin Type | Emulsion | Emulsion | Emulsion | Suspension | Suspension |
|---|---|---|---|---|---|
| Circulation Rate | 80 gallons/minute | 75 gallons/minute | 90 gallons/minute | 125 gallons/minute | 150 gallons/minute |
| Presure (Vacuum) Inches of Mercury | 17 | 19 | 19 | 17 | 18.5 |
| Temperature °F. | 157 | 150 | 150 | 150 | 150 |
| Percent Solids | 24.9 | 34.0 | 36.5 | 31.2 | 27.7 |
| Time (Hours) | Vinyl Chloride Monomer Concentration Parts Per Million | | | | |
| 0 | 4786 | — | 7780 | 259* | 156* |
| 1 | 492 | 32 | 21 | — | 42 |
| 1.5 | 188 | 17 | 24 | 15 | 22.6 |
| 2.0 | 206 | 11 | 16 | 20 | 13.2 |

*Prestripped in reactor by steam sparging.

EXAMPLE 9

Aqueous polyvinyl chloride resin mixtures were passed over a surface with a median length of 124 feet and a width of 8.75 inches. The surface contained ridges which extended across the short dimension of the surface. The surface was sloped at 0.57 inches per foot over the long dimension at the median. The surface was vibrated at a frequency of 950 cycles per minute over an amplitude of 0.10 inches in the vertical direction. The resin mixtures flowed down the long dimension of the chute.

Four thousand gallons of the aqueous resin mixture was prepared and circulated over the vibrating surface. The aqueous resin mixture was pumped from a reactor over the vibrating surface and returned to the reactor. Samples of the resin mixture in the line to the pump were periodically taken and the amount of vinyl chloride monomer determined. Table 9 is a tabulation of the data of the experiments.

Example 9 clearly illustrates that the process of the invention can effectively remove vinyl chloride monomer from an aqueous polyvinyl chloride resin mixture in commercial practice.

The example also illustrates that the process can effectively reduce the vinyl chloride monomer content in aqueous suspension resin mixtures.

What is claimed is:

1. A method of separating vinyl chloride monomer from an aqueous polyvinyl chloride resin mixture said mixture comprising water and polyvinyl chloride and having a polyvinyl chloride content of about 10 to about 50 weight percent; which method consists essentially of passing said aqueous resin mixture into a stripping zone under conditions of elevated temperature, subatmospheric pressure, and contact with a vibrating surface vibrating at a frequency in the range of less than about 6,000 cycles per minute; wherein said condition of elevated temperature is obtained by (1) heating said aqueous resin mixture before contact with said vibrating surface, or (2) introducing steam directly into the stripping zone into which said aqueous resin mixture is flowing over said vibrating surface; and recovering said aqueous resin mixture with a reduced vinyl chloride monomer content.

2. The method of claim 1 wherein the vibrating surfaces has ridges, undulations, bumps, dimples or protrusions effective to increase the interaction of the vibrating surface and the aqueous resin mixture.

3. The process of claim 1 wherein said polyvinyl chloride resin mixture is a latex feed, the elevated temperature is about 110° to about 180° F., the pressure is between about 1 to about 20 inches of mercury vacuum, and the vibrating surface has a frequency in the range of 870 to 3,600 cycles per minute.

4. A method of separating vinyl chloride monomer from an aqueous polyvinyl chloride resin mixture, said mixture comprising water and polyvinyl chloride and having a polyvinyl chloride content of about 10 to about 50 weight percent; which method consists essentially of passing said aqueous resin mixture into a stripping zone under conditions of elevated temperature, subatmospheric pressure, and contact with a vibrating surface vibrating at a frequency in the range of less than about 6,000 cycles per minute; wherein said condition of elevated temperature is obtained by heating said aqueous resin mixture before contact with said vibrating surface and recovering said aqueous resin mixture with a reduced vinyl chloride monomer content.

5. The method of claim 4 wherein the vibrating surface has ridges, undulations, bumps, dimpls or protrusions effective to increase the interaction of the vibrating surface and the aqueous resin mixture.

6. The process of claim 4 wherein said polyvinyl chloride resin mixture is a latex feed, the elevated temperature is about 110° F. to about 180° F., the pressure is between about 1 to about 20 inches of mercury absolute, and the vibrating surface has a frequency in the range of 870 to 3,600 cycles per minute.

7. A method of separating vinyl chloride monomer from an aqueous polyvinyl chloride resin mixture, said mixture comprising water and polyvinyl chloride and having a polyvinyl chloride content of about 10 to about 50 weight percent; which method consists essentially of passing said aqueous resin mixture into a stripping zone under conditions of elevated temperature, subatmospheric pressure, and contact with a vibrating surface vibrating at a frequency below 6,000 cycles per minute; wherein said condition of elevated temperature is obtained by introducing steam directly into the stripping zone into which said aqueous resin mixture is flowing over said vibrating surface; and recovering said aqueous resin mixture with a reduced vinyl chloride mononer content.

8. The method of claim 7 wherein the vibrating surface has ridges, undulations, bumps, dimples, or protrusions effective to increase the interaction of the vibrating surface and the aqueous resin mixture.

9. The process of claim 7 wherein said polyvinyl chloride resin mixture is a latex feed, the elevated temperature is 110° F. to about 180° F., the pressure is between about 1 to about 20 inches of mercury absolute, and the vibrating surface has a frequency in the range of 870 to 3,600 cycles per minute.

* * * * *

UNITED STATES PATENT AND TRADEMARK OFFICE
CERTIFICATE OF CORRECTION

PATENT NO. : 4,375,541
DATED : March 1, 1983
INVENTOR(S) : Chung H. Wei, Leroy B. Kuhn It is certified that error appears in the above-identified patent and that said Letters Patent are hereby corrected as shown below:

Column 2, line 3, "suspersion" should be -- suspension --.

Column 2, line 29, "high" should be -- higher --.

Column 2, line 47, delete the symbol " $\rightleftarrows$ ".

Column 3, line 37, "amplitude" should be -- amplitudes --.

Column 8, line 62, "0.034" should be -- 0.084 --.

Signed and Sealed this

Thirteenth Day of March 1984

[SEAL]

Attest:

GERALD J. MOSSINGHOFF

Attesting Officer

Commissioner of Patents and Trademarks